(12) United States Patent
Kim et al.

(10) Patent No.: US 9,209,918 B2
(45) Date of Patent: Dec. 8, 2015

(54) METHOD AND APPARATUS FOR TRANSMITTING SYNCHRONIZATION CHANNEL, AND METHOD AND APPARATUS FOR RECEIVING SYNCHRONIZATION CHANNEL

(71) Applicant: ELECTRONICS AND TELECOMMUNICATIONS RESEARCH INSTITUTE, Daejeon (KR)

(72) Inventors: Seokki Kim, Gyeonggi-do (KR); Sung Cheol Chang, Daejeon (KR); Mi Young Yun, Daejeon (KR); Eunkyung Kim, Daejeon (KR); Won-Ik Kim, Daejeon (KR); Hyun Lee, Daejeon (KR); Sung Kyung Kim, Daejeon (KR); Chul Sik Yoon, Seoul (KR); Kwang Jae Lim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 121 days.

(21) Appl. No.: 13/737,942

(22) Filed: Jan. 9, 2013

(65) Prior Publication Data
US 2013/0177030 A1    Jul. 11, 2013

(30) Foreign Application Priority Data

Jan. 10, 2012  (KR) .................. 10-2012-0002757
Dec. 7, 2012   (KR) .................. 10-2012-0142280

(51) Int. Cl.
*H04W 74/08*  (2009.01)
*H04J 3/06*    (2006.01)
(Continued)

(52) U.S. Cl.
CPC ............. *H04J 3/06* (2013.01); *H04B 7/2656* (2013.01); *H04W 56/00* (2013.01); *H04L 5/0007* (2013.01); *H04L 5/0037* (2013.01)

(58) Field of Classification Search
CPC .. H04B 7/2662; H04B 7/2665; H04B 7/2615; H04W 56/002; H04W 56/00; H04W 56/001; H04W 28/04; H04W 48/16; H04W 92/02; H04W 28/06; H04L 5/0037; H04L 5/0007; H04L 5/0091
USPC .......... 370/318, 328, 329, 338, 350, 474, 504
See application file for complete search history.

(56) References Cited

U.S. PATENT DOCUMENTS 7,400,898 B2 * 7/2008 Kang .................... H04L 1/1614
                                                      370/208
8,068,454 B2 * 11/2011 Bonta et al. ................... 370/329
(Continued)

FOREIGN PATENT DOCUMENTS

JP     09-008725 A    1/1997
KR  10-2009-0043696 A 5/2009

*Primary Examiner* — Brian O'Connor
(74) *Attorney, Agent, or Firm* — Rabin & Berdo, P.C.

(57) ABSTRACT

In a direct communication between terminals, a terminal transmits a synchronization channel preamble part after transmitting a synchronization channel message part including synchronization information. The terminal receives a dedicated channel including a direct communication packet after transmitting the synchronization channel preamble part. A transition time gap for switching from transmission to reception may be inserted to an end of the synchronization channel preamble part.

5 Claims, 5 Drawing Sheets

(51) Int. Cl.
  *H04W 56/00*  (2009.01)
  *H04B 7/26*   (2006.01)
  *H04L 5/00*   (2006.01)

(56) References Cited

U.S. PATENT DOCUMENTS

| | | | | |
|---|---|---|---|---|
| 8,068,786 | B2 * | 11/2011 | Pawar | H04W 72/082 455/63.1 |
| 8,391,131 | B2 * | 3/2013 | Baldemair | H04J 13/0003 370/208 |
| 8,488,634 | B2 * | 7/2013 | Novak et al. | 370/509 |
| 8,542,639 | B2 * | 9/2013 | Kwak et al. | 370/329 |
| 8,750,162 | B2 * | 6/2014 | Lee | H04L 5/0007 370/254 |
| 8,780,813 | B2 * | 7/2014 | Beems Hart | H04L 5/0037 370/329 |
| 8,804,691 | B1 * | 8/2014 | Zhao et al. | 370/350 |
| 8,855,044 | B2 * | 10/2014 | Liao | H04W 56/0045 370/324 |
| 8,861,624 | B2 * | 10/2014 | Kwon | H04L 5/0035 375/219 |
| 8,886,205 | B2 * | 11/2014 | Gaal | H04W 56/0045 455/450 |
| 8,948,064 | B2 * | 2/2015 | Shahar | H04L 5/0037 370/278 |
| 8,953,534 | B2 * | 2/2015 | Hong | H04W 72/082 370/328 |
| 2008/0192776 | A1 * | 8/2008 | Fleming et al. | 370/514 |
| 2009/0116430 | A1 | 5/2009 | Bonta et al. | |
| 2009/0175261 | A1 * | 7/2009 | Oh et al. | 370/350 |
| 2010/0027694 | A1 * | 2/2010 | Touboul et al. | 375/260 |
| 2011/0075748 | A1 * | 3/2011 | Novak et al. | 375/260 |
| 2012/0113955 | A1 * | 5/2012 | Cho et al. | 370/330 |

* cited by examiner

METHOD AND APPARATUS FOR TRANSMITTING SYNCHRONIZATION CHANNEL, AND METHOD AND APPARATUS FOR RECEIVING SYNCHRONIZATION CHANNEL

CROSS-REFERENCE TO RELATED APPLICATION

This application claims priority to and the benefit of Korean Patent Application Nos. 10-2012-0002757 and 10-2012-0142280 filed in the Korean Intellectual Property Office on Jan. 10, 2012 and Dec. 7, 2012, the entire contents of which are incorporated herein by reference.

BACKGROUND OF THE INVENTION (a) Field of the Invention

The present invention generally relates to a synchronization channel. More particularly, the present invention generally relates to a synchronization channel for a direct communication between terminals.

(b) Description of the Related Art

A wireless access system uses a division duplex for a bi-directional communication. In general, a time division duplex (TDD) for dividing time resources to form an uplink and a downlink and a frequency division duplex (FDD) for dividing frequency resources to form the uplink and the downlink are used. The TDD needs a transition time gap (TTG) when a transmitting operation and a receiving operation are switched.

Recently, a direct communication between terminals is developed for a reliable wireless communication in degraded network conditions. For example, IEEE 802.16n or IEEE 802.16.1a standard group is working on this research. The direct communication uses some of infra communication resources, and a voice/video communication and data transmission/reception between the terminals can be performed in the infra communication system and green field condition where the infra communication system is destroyed. A distributed synchronization scheme is used for synchronization of a direct communication terminal, and some of the direct communication resources are used to transmit a synchronization channel for the distributed synchronization.

In the direct communication, the terminal can receive data through a dedicated channel after transmitting the synchronization channel, and can transmit data through the dedicated channel after receiving the synchronization channel. In this case, a transmitting/receiving (Tx/Rx) transition time is required between the synchronization channel and the dedicated channel. However, when the Tx/Rx transition time is inserted in a synchronization channel structure of a conventional direct communication, the terminal cannot transmit some data of the synchronization channel message part. In this case, because the terminal should increase a code rate of the message part to transmit all data, reliability of the message can be deteriorated. Further, if a fixed Tx/Rx transition time is inserted although some terminals require the Tx/Rx transition time, resource efficiency is decreased.

SUMMARY OF THE INVENTION

Aspects of the present invention provide a synchronization channel structure for efficiently operating a Tx/Rx transition time.

According to an aspect of the present invention, a method of transmitting a synchronization channel is provided by a terminal in a direct communication between terminals. The method includes transmitting a synchronization channel message part including synchronization information, transmitting a synchronization channel preamble part after transmitting the synchronization channel message part, and receiving a dedicated channel including a direct communication packet after transmitting the synchronization channel preamble part.

A transition time gap for switching from transmission to reception may be inserted to an end of the synchronization channel preamble part.

A frame for the direct communication may include a plurality of subframes, and the first frame of the plurality of subframes may be assigned to the synchronization channel. The first subframe may include the synchronization channel message part and the synchronization channel preamble part that is disposed after the synchronization channel message part.

Some subframes including the second subframe of the plurality of subframes may be assigned to the dedicated channel.

The synchronization channel preamble part may include repetition of a time domain preamble sequence.

According to another aspect of the present invention, a method of receiving a synchronization channel is provided by a terminal in a direct communication between terminals. The method includes receiving a synchronization channel message part including synchronization information, receiving a synchronization channel preamble part after receiving the synchronization channel message part, and transmitting a dedicated channel including a direct communication packet after receiving the synchronization channel preamble part.

A transition time gap for switching from reception to transmission may be inserted to an end of the synchronization channel preamble part.

According to yet another aspect of the present invention, an apparatus for transmitting a synchronization channel is provided in a direct communication between terminals. The apparatus includes a transmitter configured to transmit a synchronization channel preamble part after transmitting a synchronization channel message part including synchronization information, and a receiver configured to receive a dedicated channel including a direct communication packet after the transmitter transmits the synchronization channel preamble part.

The apparatus may further include a controller configured to insert a transition time gap for switching from transmission to reception to an end of the synchronization channel preamble part.

According to yet another aspect of the present invention, an apparatus for receiving a synchronization channel is provided in a direct communication between terminals. The apparatus includes a receiver configured to receive a synchronization channel preamble part after receiving a synchronization channel message part including synchronization information, and a transmitter configured to transmit a dedicated channel including a direct communication packet after the receiver receives the synchronization channel preamble part.

The apparatus may further include a controller configured to insert a transition time gap for switching from reception to transmission to an end of the synchronization channel preamble part.

DETAILED DESCRIPTION OF THE EMBODIMENTS

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, the term "terminal" may designate a mobile terminal (MT), a mobile station (MS), an advanced mobile station (AMS), a high reliability mobile station (HR-MS), a subscriber station (SS), a portable subscriber station (PSS), an access terminal (AT), a user equipment (UE), and so on, or may include all or some functions thereof.

Further, the term "base station" (BS) may designate an advanced base station (ABS), a high reliability base station (HR-BS), a node B, an evolved node B (eNodeB), an access point (AP), a radio access station (RAS), a base transceiver station (BTS), an MMR (mobile multihop relay)-BS, a relay station (RS) performing base station function, a relay node (RN) performing base station function, an advanced relay station (ARS) performing base station function, a high reliability relay station (HR-RS) performing the base station function, a small cell BS (femto BS, home node B (HNB), pico BS, metro BS, micro BS, and so on), and so on, or may include all or some functions thereof.

Figure 1:
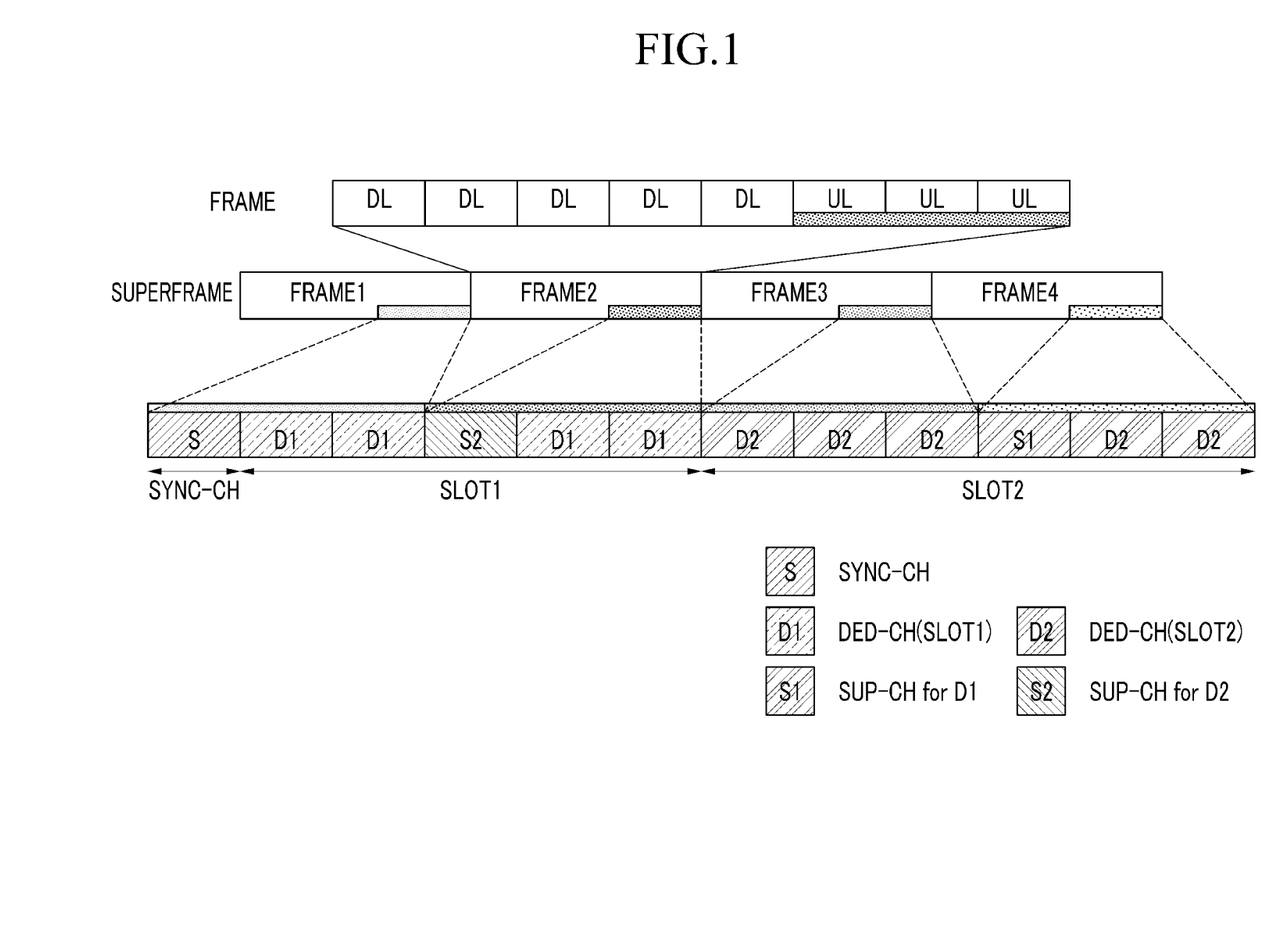
FIG. 1 shows a frame structure of a direct communication system according to an embodiment of the present invention.
Figure 2:
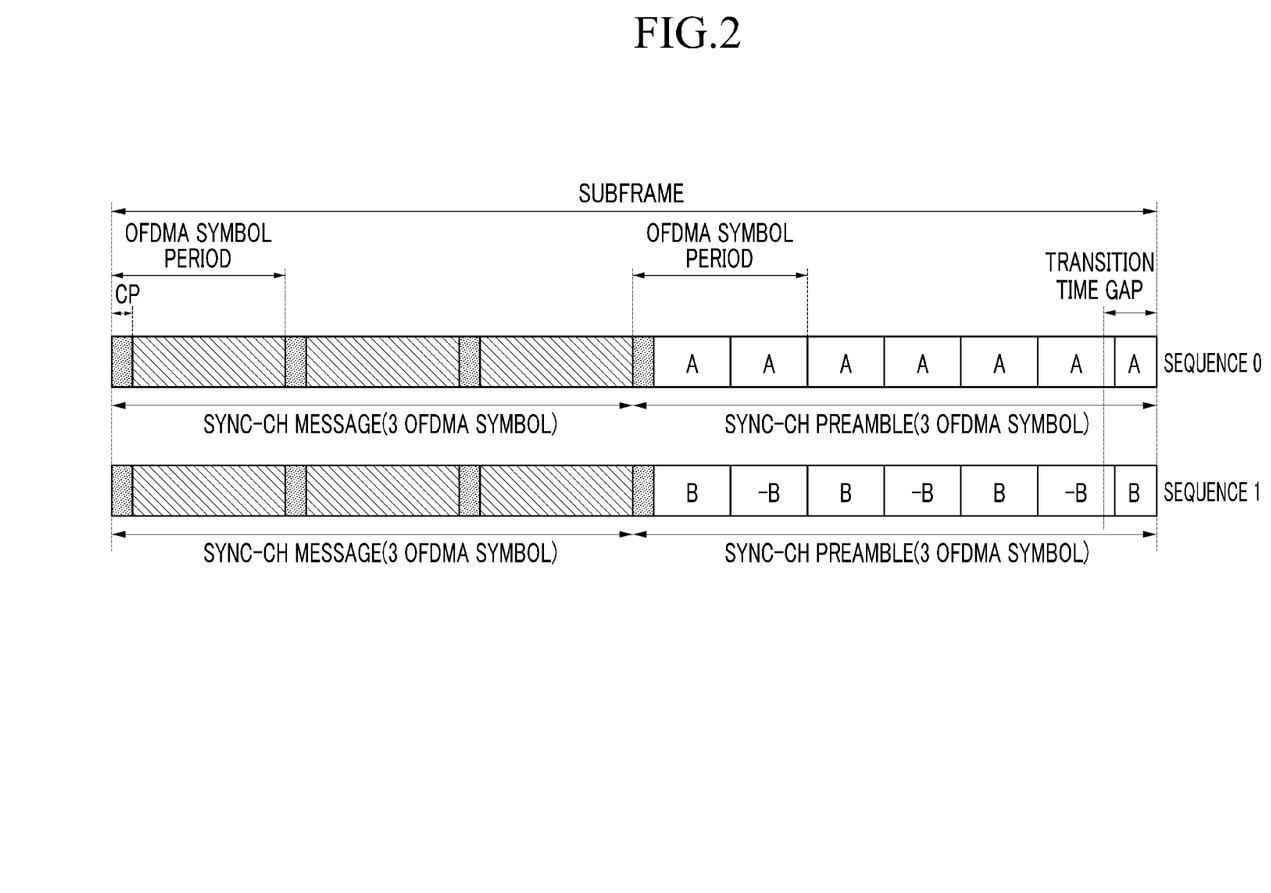
FIG. 2 shows a synchronization channel structure of a direction communication frame shown in FIG. 1.

FIG. 1 shows a frame structure of a direct communication system according to an embodiment of the present invention, and FIG. 2 shows a synchronization channel structure of a direction communication frame shown in FIG. 1.

Referring to FIG. 1, a superframe includes a plurality of infra communication frames, for example four infra communication frames, and each infra communication frame includes a plurality of subframes, for example eight subframes. Each subframe includes a plurality of orthogonal frequency division multiple access (OFDMA) symbols, for example six OFDMA symbols. Some of the subframes, for example five subframes, are downlink (DL) subframes, and remaining subframes, for example three subframes, are uplink (UL) subframes. The UL subframes may be used as dedicated resources for a direct communication.

Some resources of each infra communication frame, for example three UL subframes, are used for the direct communication. Direct communication resources included in a plurality of infra communication frames, for example four infra communication frames, are collected to form one direct communication frame. Therefore, one direct communication frame includes, for example, twelve subframes.

The direct communication frame includes one synchronization channel (SYNC-CH), two dedicated channels (DED-CHs), and two supplementary channels (SUP-CHs). The SYNC-CH is used for a distributed synchronization, and may be assigned to the first subframe of the direct communication frame. The two DED-CHs are channels to send direct communication packets for terminals, and each of the two DED-CHs forms a slot. The two SUP-CHs correspond to the two DED-CHs, respectively. For example, the second to sixth subframes of the twelve subframes are assigned to the first slot, i.e., the first DED-CH, and the fourth subframe corresponds to the SUB-CH for the second DED-CH. Further, the seventh to twelfth subframes are assigned to the second slot, i.e., the second DED-CH, and the tenth subframe corresponds to the SUB-CH for the first DED-CH.

When a certain terminal receives the DED-CH of the first slot (slot 1) after transmitting the SYNC-CH or transmits the DED-CH of the first slot (slot 1) after receiving the SYNC-CH, a Tx/Rx transition time is required between the SYNC-CH and the DED-CH of the first slot (slot 1). According to an embodiment of the present invention, the last part of the SYNC-CH is used as the transition time for switching from Tx to Rx or switching from Rx to Tx.

Referring to FIG. 2, the SYNC-CH includes a SYNC-CH message part and a SYNC-CH preamble part. The SYNC-CH message part is used for transmitting synchronization information, and includes, for example, three OFDMA symbols. The synchronization information may be provided by a synchronization channel information element (SYNC-CH IE), and includes, for example, reference time type, hop count, reference signal strength, frame structure, and CRC. The SYNC-CH preamble part is used for estimating time and frequency synchronization, and includes, for example, three OFDMA symbols. Some terminals of all direct communication terminals may be selected as terminals for transmitting the SYNC-CH by using information of the SYNC-CH message part.

In the SYNC-CH message part, each SYNC-CH symbol includes a cyclic prefix (CP) and a message body. In the SYNC-CH preamble part, a plurality of subcarriers, for example 72 subcarriers, are assigned to transmit the SYNC-CH in a frequency domain. A preamble sequence with binary codes is mapped to some subcarriers, for example 36 subcarriers, and remaining subcarriers are not used. A time domain preamble sequence is obtained by taking an inverse fast Fourier transform (IFFT) of the frequency domain preamble sequence. In a time domain, a sequence 0 is composed of repetition of basic pattern (A) with $N_{FFT}/2$ samples, and a sequence 1 is composed of a basic pattern (B) with $N_{FFT}/2$ samples and a sign reversed version (−B) of the basic pattern. The $N_{FFT}$ is a fast Fourier transform (FFT) size. The first SYNC-CH symbol is defined by the CP and the time domain preamble sequence, and remaining SYNC-CH symbols are defined by the repetition of the time domain preamble sequence without the CP. The time domain preamble sequence is repeated by (2+α) times, a is given by $2N_{CP}/N_{FFT}$, and $N_{CP}$ is a CP length.

As shown in FIG. 2, the terminal transmits the message part prior to the preamble part, and may insert the Tx/Rx transition time to an end of the preamble part if necessary. Therefore, the Tx/Rx transition time does not affect the data transmission of the message part.

Next, a method for transmitting a synchronization channel or a method for receiving a synchronization channel according to an embodiment of the present invention is described with reference to FIG. 3 to FIG. 6.

Figure 3:
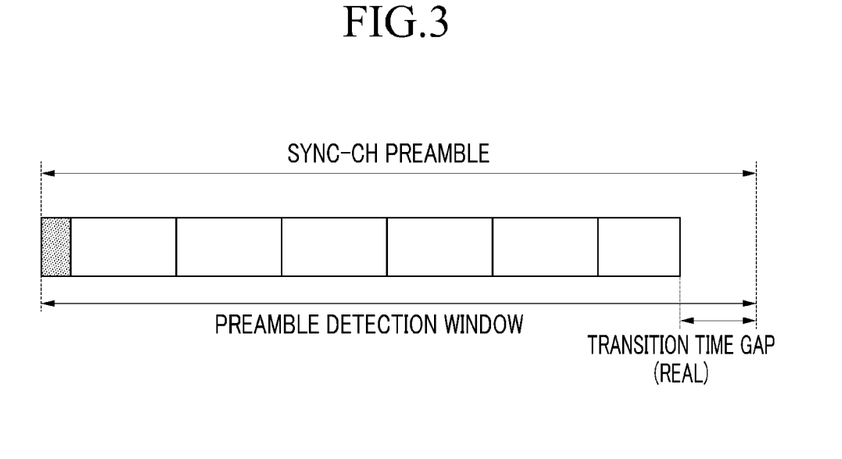
FIG. 3 and FIG. 4 show a method for transmitting a synchronization channel according to an embodiment of the present invention.
Figure 4:
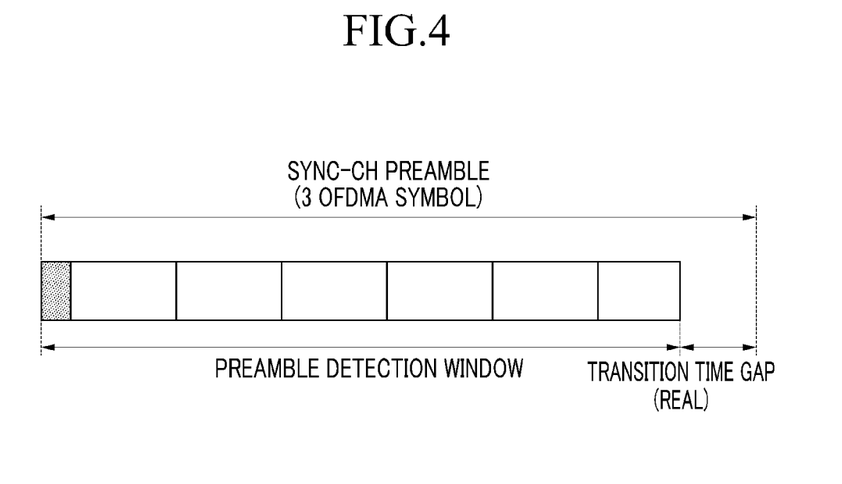
Figure 5:
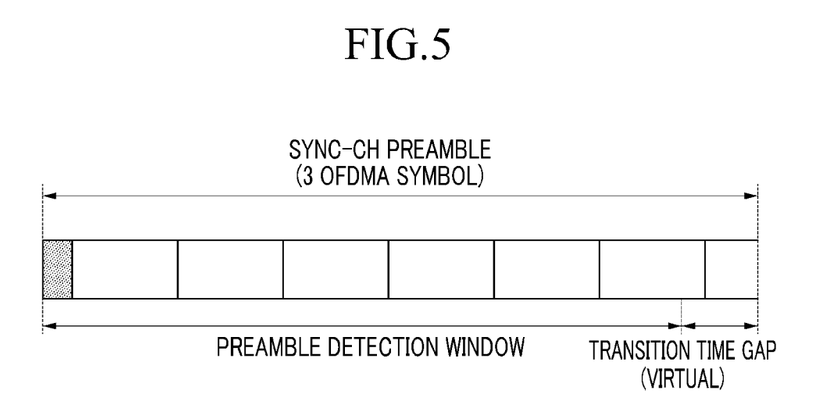
FIG. 5 and FIG. 6 show a method for receiving a synchronization channel according to an embodiment of the present invention.
Figure 6:
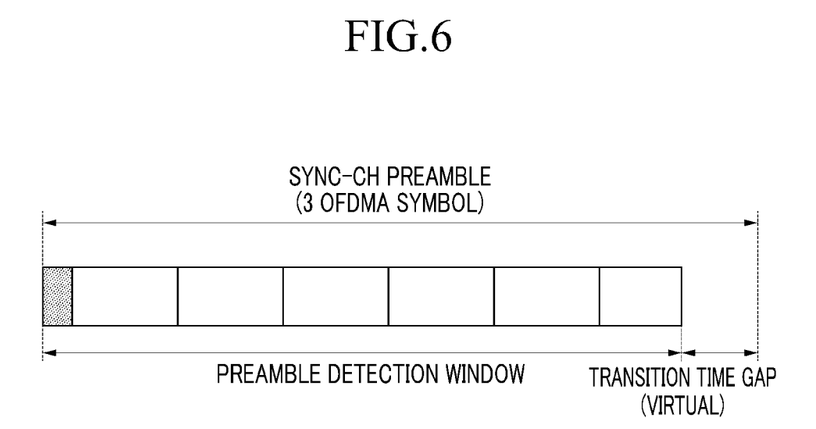

FIG. 3 and FIG. 4 show a method for transmitting a synchronization channel according to an embodiment of the present invention, and FIG. 5 and FIG. 6 show a method for receiving a synchronization channel according to an embodiment of the present invention.

Referring to FIG. 3 and FIG. 4, when a terminal transmitting synchronization information receives a DED-CH in a slot 1 after transmitting a SYNC-CH, the terminal inserts a transition time gap to an end of a SYNC-CH preamble part. In other words, the terminal shortens a length of a preamble sequence to acquire a Tx/Rx transition time. In this case, a terminal that requires no Tx/Rx transition time sets a window for detecting the preamble of the SYNC-CH as shown in FIG. 3, and a terminal that requires the Tx/Rx transition time sets the window for detecting the preamble of the SYNC-CH as shown in FIG. 4.

Referring to FIG. 5 and FIG. 6, when a terminal transmitting no synchronization information transmits a DED-CH in a slot 1 after receiving a SYNC-CH, the terminal determines that a virtual Tx/Rx transition time exists, and sets a preamble detection window to a size obtained by deleting the transition time gap from the end of the preamble part. In this case, a preamble transmitted by a terminal that requires no Tx/Rx transition time from among terminals transmitting synchronization information is shown as FIG. 5, and a preamble transmitted by a terminal that requires the Tx/Rx transition time from among the terminals transmitting synchronization information is shown as FIG. 6.

As such, according to an embodiment of the present invention, the terminal does not need abandon some data of the message part to acquire the Tx/Rx transition time or deteriorate reliability of the message by increasing a code rate. In this case, the terminal may store the message part in a memory until completing to receive the preamble part.

On the other hand, when a terminal that requires no Tx/Rx transition time receives a SYNC-CH to which the Tx/Rx transition time is inserted, the terminal may recognize a part that is used for the Tx/Rx transition time and has no signal as a preamble such that influence of a noise can be increased. However, because the Tx/Rx transition time occupies a small area compared with entire preamble according to an embodiment of the present invention, it is no problem to perform frame acquisition and frequency/time offset estimation by using the preamble. Further, the terminal may insert the Tx/Rx transition time when necessary and uses a virtual Tx/Rx transition time, thereby minimizing inefficiency of resources and deterioration of receiving performance for the SYNC-CH preamble that can occur by insertion of a fixed Tx/Rx transition time.

Next, an apparatus for transmitting/receiving synchronization channel for performing a method for transmitting/receiving synchronization channel according to an embodiment of the present invention is described with reference to FIG. 7 and FIG. 8.

Figure 7:
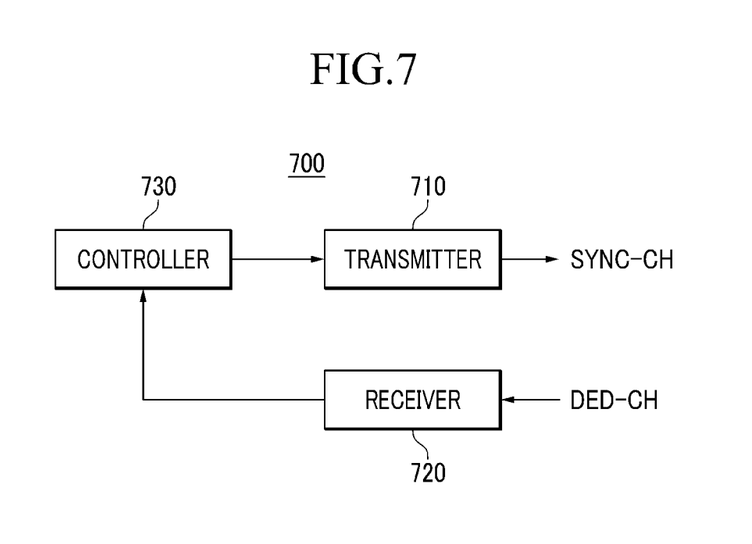
FIG. 7 is a block diagram of a synchronization channel transmitting apparatus according to an embodiment of the present invention
Figure 8:
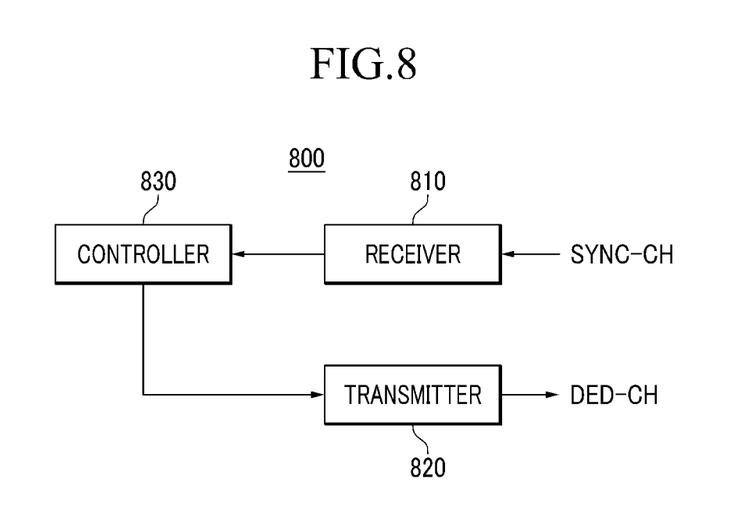
FIG. 8 is a block diagram of a synchronization channel receiving apparatus according to an embodiment of the present invention.

FIG. 7 is a block diagram of a synchronization channel transmitting apparatus according to an embodiment of the present invention, and FIG. 8 is a block diagram of a synchronization channel receiving apparatus according to an embodiment of the present invention.

Referring to FIG. 7, a synchronization channel transmitting apparatus 700 includes a transmitter 710, a receiver 720, and a controller 730. The synchronization channel transmitting apparatus 700 shown in FIG. 7 may be included in a terminal or may be the terminal.

The transmitter 710 transmits a SYNC-CH message part and then transmits a SYNC-CH preamble part. The receiver 720 receives a DED-CH from other terminal after the transmitter 710 transmits the SYNC-CH. The controller 730 inserts a transition time gap to an end of the SYNC-CH preamble part for a Tx/Rx transition time of the terminal corresponding to the synchronization channel transmitting apparatus 700.

Referring to FIG. 8, a synchronization channel receiving apparatus 800 includes a receiver 810, a transmitter 820, and a controller 830. The synchronization channel receiving apparatus 800 shown in FIG. 8 may be included to a terminal or may be the terminal.

The receiver 810 receives a SYNC-CH message part from a terminal transmitting synchronization information and then receives a SYNC-CH preamble part. The transmitter 820 transmits a DED-CH to other terminal after the receiver 810 receives the SYNC-CH. The controller 830 inserts a transition time gap to an end of the SYNC-CH preamble part for a Tx/Rx transition time of the terminal corresponding to the synchronization channel receiving apparatus 800.

At least some functions of a synchronization channel transmitting/receiving method/apparatus according to an embodiment of the present invention may be embodied by hardware or software combined with the hardware. For example, a processor that is embodied by a central processing unit (CPU), a chipset, or a microprocessor, etc. may perform a function of the controller 730 or 830, and a transceiver may perform a function of the transmitter 710 or 820 or a receiver 720 or 810.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A method of transmitting a synchronization channel by a terminal in a direct communication between terminals, the method comprising:

using uplink (UL) subframes of a superframe as dedicated resources for the direct communication, the superframe including a plurality of infra communication frames, each infra communication frame including a plurality of subframes, each subframe including a plurality of orthogonal frequency division multiple access (OFDMA) symbols, a part of the plurality of subframes being downlink (DL) subframes and a remaining part of the plurality of subframes being the UL subframes, the dedicated resources forming a direct communication frame including a plurality of subframes, the direct communication frame including a synchronization channel, a plurality of dedicated channels and a plurality of supplementary channels, the synchronization channel being used for a distributed synchronization, the plurality of dedicated channels to send direct communication packets for terminals, the plurality of supplementary channels corresponding to the plurality of dedicated channels, wherein when a terminal receives the dedicated channel after transmitting the synchronization channel or transmits the dedicated channel after receiving the synchronization channel, a transmission-to-reception or reception-to-transmission transition time is required between the synchronization channel and the dedicated channel;

transmitting a synchronization channel message part including synchronization information;

transmitting a synchronization channel preamble part after transmitting the synchronization channel message part, the synchronization channel preamble part being used for estimating time and frequency synchronization; and receiving a dedicated channel including a direct communication packet after transmitting the synchronization channel preamble part, the dedicated channel being dedicated for the direct communication between terminals and the dedicated channel being adjacent to the synchronization channel preamble part;

wherein a transition time gap for the required transmission-to-reception or reception-to-transmission transition time is inserted to an end of the synchronization channel preamble part and within a first subframe of a plurality of subframes, the first subframe including the synchronization channel message part and the synchronization channel preamble part.

2. The method of claim 1, wherein the synchronization channel preamble part includes repetition of a time domain preamble sequence.

3. A method of receiving a synchronization channel by a terminal in a direct communication between terminals, the method comprising:

using uplink (UL) subframes of a superframe as dedicated resources for the direct communication, the superframe including a plurality of infra communication frames, each infra communication frame including a plurality of subframes, each subframe including a plurality of orthogonal frequency division multiple access (OFDMA) symbols, a part of the plurality of subframes being downlink (DL) subframes and a remaining part of the plurality of subframes being the UL subframes, the dedicated resources forming a direct communication frame including a plurality of subframes, the direct communication frame including a synchronization channel, a plurality of dedicated channels and a plurality of supplementary channels, the synchronization channel being used for a distributed synchronization, the plurality of dedicated channels to send direct communication packets for terminals, the plurality of supplementary channels corresponding to the plurality of dedicated channels, wherein when a terminal receives the dedicated channel after transmitting the synchronization channel or transmits the dedicated channel after receiving the synchronization channel, a transmission-to-reception or reception-to-transmission transition time is required between the synchronization channel and the dedicated channel;

receiving a synchronization channel message part including synchronization information;

receiving a synchronization channel preamble part after receiving the synchronization channel message part, the synchronization channel preamble part being used for estimating time and frequency synchronization; and transmitting a dedicated channel including a direct communication packet after receiving the synchronization channel preamble part, the dedicated channel being dedicated for the direct communication between terminals and the dedicated channel being adjacent to the synchronization channel preamble part;

wherein a transition time gap for the required transmission-to-reception or reception-to-transmission transition time is inserted to an end of the synchronization channel preamble part and within a first subframe of a plurality of subframes, the first subframe including the synchronization channel message part and the synchronization channel preamble part; and wherein when the terminal receiving the synchronization channel does not require the transition time gap, the terminal sets a preamble detection window to a size obtained by deleting the transition time gap from the end of the synchronization channel preamble part.

4. The method of claim 3, wherein the synchronization channel preamble part includes repetition of a time domain preamble sequence.

5. A method of a direct communication by a first terminal with at least one second terminal, the method comprising:

transmitting a synchronization channel message part including synchronization information to the second terminal;

transmitting a synchronization channel preamble part to the second terminal after transmitting the synchronization channel message part, the synchronization channel preamble part being used for estimating time and frequency synchronization; and transmitting, to the second terminal, or receiving, from the second terminal, a dedicated channel including a direct communication packet after transmitting the synchronization channel preamble part, the dedicated channel being dedicated for the direct communication between the first terminal and the second terminal, wherein, in case the first terminal receives the dedicated channel from the second terminal after transmitting the synchronization channel preamble part, a transition time gap is inserted between the synchronization channel preamble part and the dedicated channel, and in case the first terminal transmits the dedicated channel to the second terminal after transmitting the synchronization channel preamble part, the transition time gap is not inserted between the synchronization channel preamble part and the dedicated channel.

\* \* \* \* \*